United States Patent
Saucke et al.

(10) Patent No.: US 10,052,967 B2
(45) Date of Patent: Aug. 21, 2018

(54) ELECTRIC VOLTAGE SYSTEM AND METHOD FOR DISTRIBUTING ELECTRICAL POWER IN AN ELECTRIC VOLTAGE SYSTEM

(71) Applicant: VOLKSWAGEN AG, Wolfsburg (DE)

(72) Inventors: Wolfgang Saucke, Wittingen (DE); Florian Kühnlenz, Barwedel (DE); Daniel Urbschat, Braunschweig (DE)

(73) Assignee: Volkswagen AG (DE)

( * ) Notice: Subject to any disclaimer, the term of this patent is extended or adjusted under 35 U.S.C. 154(b) by 88 days.

(21) Appl. No.: 15/251,523

(22) Filed: Aug. 30, 2016

(65) Prior Publication Data

US 2017/0166079 A1  Jun. 15, 2017

(30) Foreign Application Priority Data

Dec. 10, 2015  (DE) .......................... 10 2015 224 842

(51) Int. Cl.
  *H02J 7/00*   (2006.01)
  *B60L 11/18*  (2006.01)
  *H02J 7/35*   (2006.01)

(52) U.S. Cl.
  CPC ....... *B60L 11/1866* (2013.01); *B60L 11/1861* (2013.01); *H02J 7/0054* (2013.01); *H02J 7/35* (2013.01); *B60L 2210/10* (2013.01)

(58) Field of Classification Search
  CPC . H02J 7/35; H02J 7/355; Y02E 60/12; H01M 10/465; H01M 16/006
  USPC ........................................................ 320/101
  See application file for complete search history.

(56) References Cited

U.S. PATENT DOCUMENTS

| 4,348,628 A * | 9/1982 | Loucks | H02J 7/1423 |
| | | | 180/65.1 |
| 8,120,308 B2 * | 2/2012 | Ward | B60L 8/003 |
| | | | 180/2.1 |
| 2008/0154472 A1 * | 6/2008 | Okuda | B60K 6/44 |
| | | | 701/93 |
| 2009/0001926 A1 | 1/2009 | Sato | |

(Continued)

FOREIGN PATENT DOCUMENTS

| DE | 19736414 A1 | 3/1998 |
| DE | 102004062186 A1 | 7/2006 |

(Continued)

*Primary Examiner* — Arun Williams
(74) *Attorney, Agent, or Firm* — Barnes & Thornburg LLP

(57) ABSTRACT

An electrical power supply network for a motor vehicle, including at least one high-voltage battery and one low-voltage battery, wherein at least one DC/DC converter is arranged between the high-voltage battery and the low-voltage battery, which is designed such that the high-voltage battery charges the low-voltage battery, and at least one solar module, which is connected to the low-voltage battery via a DC/DC converter, wherein at least one control device is associated with the low-voltage battery which is designed such that an SOC value of the low-voltage battery is ascertained, wherein during a vehicle standstill, the high-voltage battery is charged from the low-voltage battery via a DC/DC converter until the SOC value of the low-voltage battery reaches a first threshold value. Also disclosed is a method for distributing electrical energy in such a power supply network.

8 Claims, 1 Drawing Sheet

(56) References Cited

U.S. PATENT DOCUMENTS

| | | | |
|---|---|---|---|
| 2009/0186256 A1* | 7/2009 | Iida | B60K 15/04 |
| | | | 429/515 |
| 2013/0054069 A1 | 2/2013 | Komiya et al. | |
| 2014/0095018 A1 | 4/2014 | Atluri et al. | |
| 2015/0349582 A1* | 12/2015 | Maeno | B60L 3/0046 |
| | | | 320/101 |
| 2016/0105052 A1* | 4/2016 | Lee, II | H02J 7/0054 |
| | | | 320/101 |

FOREIGN PATENT DOCUMENTS

| | | |
|---|---|---|
| DE | 102005045107 A1 | 3/2007 |
| DE | 102009000055 A1 | 7/2010 |
| DE | 102009027685 A1 | 1/2011 |
| ES | 2316268 A1 | 4/2009 |

* cited by examiner

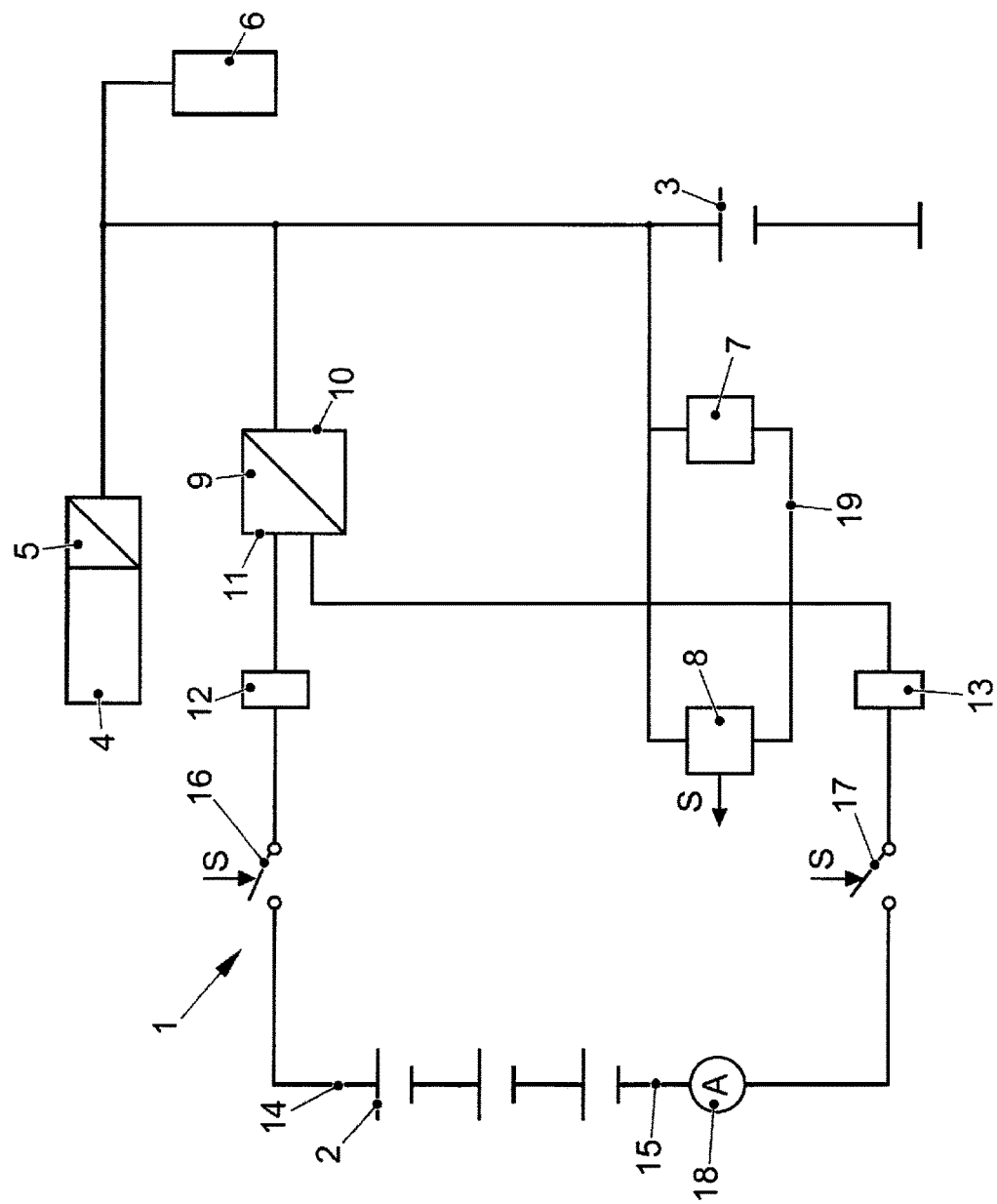

ELECTRIC VOLTAGE SYSTEM AND METHOD FOR DISTRIBUTING ELECTRICAL POWER IN AN ELECTRIC VOLTAGE SYSTEM

PRIORITY CLAIM

This patent application claims priority to German Patent Application No. 10 2015 224 842.9, filed 10 Dec. 2015, the disclosure of which is incorporated herein by reference in its entirety.

SUMMARY

Illustrative embodiments relate to an electrical power supply network and a method for distributing electrical energy in an electrical power supply network for a motor vehicle.

BRIEF DESCRIPTION OF THE DRAWINGS

The disclosed embodiments will be described in greater detail below with reference to the drawing.

FIG. 1 shows a schematic block diagram of an electrical power supply network.

DETAILED DESCRIPTION

DE 10 2009 027 685 A1 discloses an electrical power supply network for a motor vehicle, including at least one high-voltage battery and one low-voltage battery, wherein at least one DC/DC converter is arranged between the high-voltage battery and the low-voltage battery. In addition, the power supply network has a solar module which is connected to the DC/DC converter via a temporary store. The DC/DC converter is designed in such a way that the electrical energy may be fed from the temporary store into the high-voltage battery. Furthermore, the low-voltage battery is able to be charged from the high-voltage battery via the DC/DC converter. This circuit is described as disadvantageous with respect to efficiency. Therefore, a solar-supported battery charging apparatus is furthermore proposed there, which has a control device with a connection device for receiving a charging voltage supplied by a solar module. The control device is designed in such a way as to selectively connect through the charging voltage supplied by the solar module to one or more of the cell blocks of a high-voltage store, the high-voltage store being divided into multiple cell blocks which have a lower nominal voltage than the overall high-voltage store. Furthermore, the battery charging apparatus has a measuring device for measuring one or multiple parameters of the multiple cell blocks of the high-voltage store, and a control device to selectively connect through the charging voltage supplied by the solar module to one or more of the cell blocks based on the one or multiple measured parameters, to charge them selectively.

Disclosed embodiments provide an electrical power supply network for a vehicle, by which the efficiency of the energy distribution may be improved, and a method for distributing electrical energy in an electrical power supply network.

Disclosed embodiments provide a power supply network and a method.

For this purpose, the electrical power supply network for a motor vehicle includes at least one high-voltage battery and one low-voltage battery, wherein at least one DC/DC converter is arranged between the high-voltage battery and the low-voltage battery. A high-voltage battery may be understood to be a battery having a nominal voltage of more than 60 V. Correspondingly, a low-voltage battery is a battery having a nominal voltage of less than 60 V, for example, 12 V, 24 V, or 48 V. The DC/DC converter is designed in such a way that the high-voltage battery is able to charge the low-voltage battery. The low-voltage battery may be a low-voltage onboard electrical system battery, and the high-voltage battery may be a traction battery of the motor vehicle. Furthermore, the electrical power supply network has at least one solar module, which is connected to the low-voltage battery via a DC/DC converter. The solar module is, for example, integrated into a roof of the motor vehicle. At least one control device is associated with the low-voltage battery, which is designed in such a way that an SOC value of the low-voltage battery is ascertained, wherein during a vehicle standstill, the high-voltage battery is charged from the low-voltage battery via the DC/DC converter until the SOC value of the low-voltage battery reaches a first threshold value. Thus, it is possible to omit a temporary store, the electrical energy generated by the solar module being temporarily stored in the low-voltage battery. This temporarily stored energy is also consumed primarily by the low-voltage onboard electrical system. Therefore, converter losses are reduced during driving operation. During the vehicle standstill, the low-voltage battery is then deliberately discharged to create a sufficiently large capacity reserve, to store the generated electrical energy of the solar module in the low-voltage battery. Thus, the term "vehicle standstill" does not mean standing at a red traffic light, but rather deliberately switching off the motor vehicle.

In at least one disclosed embodiment, the control device is designed in such a way that in the case of a drop in the SOC value of the low-voltage battery below a further threshold value, the DC/DC converter between the high-voltage battery and the low-voltage battery is controlled in such a way that the high-voltage battery charges the low-voltage battery, wherein the second threshold value is smaller than the first threshold value. It is thus ensured that the onboard electrical system is sufficiently supplied with voltage, even if the solar module supplies no, or too little, electrical energy. In this case, it may be provided that the high-voltage battery holds the SOC value of the low-voltage battery constant at the second threshold value. However, it is also possible to increase the SOC value up to a further threshold value which lies above the second threshold value.

In another disclosed embodiment, the control device is designed in such a way that during the vehicle standstill or during travel, the low-voltage battery is charged by the solar module via the DC/DC converter, wherein when a third threshold value for the SOC value is reached which is greater than the first threshold value, the high-voltage battery is charged from the low-voltage battery until the first threshold value is reached. The third threshold value may lie at an SOC value of 100% or just under it, for example, 95%. Overcharging of the low-voltage battery is thus prevented.

In at least one disclosed embodiment, the first threshold value for the SOC value is selected in such a way that the remaining capacity is greater than/equal to 28 Ah. In this case, the remaining capacity is the difference between the nominal capacity and the actual capacity. The value is chosen in such a way that in the case of an assumed output of 100 W for the solar module, the probability of a required recharging of the high-voltage battery is kept low. This increases the overall efficiency of the energy distribution. In the case of correspondingly large outputs of the solar module, the remaining capacity may be correspondingly increased.

Alternatively, the remaining capacity may be selected to be less than 28 Ah, for example, 20 Ah. The benefit of this embodiment is that the probability for recharging processes of the high-voltage battery is increased to increase its SOC, the efficiency, however, being somewhat reduced due to the converter losses during recharging.

In another disclosed embodiment, at least one switching element is arranged between the high-voltage battery and the DC/DC converter, which is controlled by a control device associated with the high-voltage battery. Optionally, at least two switching elements are provided to isolate the high-voltage battery at all terminals.

The batteries may be lithium-ion batteries. Furthermore, it should be noted that at least one of the threshold values may be adjusted as a function of parameters such as detected solar radiation, battery temperature, and/or quiescent current consumption of the onboard electrical system consumers.

With respect to the configuration according to the disclosed method, reference may be made to the entire content of the previous embodiments.

FIG. 1 depicts a block diagram of an electrical power supply network 1 in a motor vehicle. The electrical power supply network 1 includes a high-voltage battery 2, a low-voltage battery 3, and a solar module 4. A DC/DC converter 5 is arranged between the solar module 4 and the low-voltage battery 3, which may have MPPT (maximum power point tracking) functionality. The DC/DC converter 5 is provided with onboard electrical system consumers on the output side, one onboard electrical system consumer 6 being depicted by way of example. The onboard electrical system consumers also include control devices 7, 8, which will be described in greater detail. An additional DC/DC converter 9, which is designed bidirectionally, is arranged between the low-voltage battery 3 and the high-voltage battery 2. Therefore, the descriptions "input" and "output" below are used only for explanation, it being possible for the energy to flow from the input side to the output side and vice-versa. The low-voltage battery 3 is connected to the input side 10 of the DC/DC converter 9, the two outputs on the output side 11 each being connected to a voltage connection 12, 13. A switching element 16, 17, which may be designed as a galvanically isolating switching element (for example, as a relay), is arranged in each case between the voltage connection 12, 13 and the respective terminal 14, 15 of the high-voltage battery 2. Furthermore, a current measuring device 18 is associated with the high-voltage battery 2. The control device 7 is associated with the low-voltage battery 3 and ascertains the SOC value of the low-voltage battery 3. The control device 7 controls the DC/DC converter 9 and, if necessary, the control device 8, both of which are interconnected in terms of data via a bus system 19, as a function of the ascertained SOC value of the low-voltage battery 3. The control device 8 is associated with the high-voltage battery 2 and controls the switching elements 16, 17 and ascertains an SOC value of the high-voltage battery 2. Furthermore, the control device 8 may also carry out cell balancing of the high-voltage battery 2.

It is assumed here that the low-voltage battery 3 has a nominal capacity of 60 Ah and currently has an actual capacity of 50 Ah. Furthermore, it is assumed that the motor vehicle is in driving operation, i.e., the switching elements 16, 17 are closed and an electric machine, which is not depicted, is powered by the high-voltage battery 2. The DC/DC converter 9 is deactivated, and all energy supplied by the solar module 4 is used for powering the onboard electrical system consumers 6, 7, 8 and charging the low-voltage battery 3.

If the motor vehicle is then shut off, the control device 7 checks the SOC value during the vehicle standstill and compares it to a first threshold value X1. If the current SOC value is greater than the first threshold value X1, the low-voltage battery 3 is deliberately discharged to the first threshold value X1. For this purpose, the DC/DC converter 9 is activated and the switching elements 16, 17 remain closed. The high-voltage battery 2 is then charged via the DC/DC converter 9 until the first threshold value X1 has been reached. The DC/DC converter 9 is then deactivated, and the control device 8 opens the switching elements 16, 17 and goes into a sleep mode.

The threshold value X1 is chosen here in such a way that the remaining capacity=nominal capacity−actual capacity is greater than/equal to 28 Ah, i.e., $X1 \approx 52\%$ at an assumed nominal capacity of 60 Ah. During the vehicle standstill, the solar module 4 supplies electrical energy via the DC/DC converter 5 for charging the low-voltage battery 3, a capacity reserve of 28 Ah being available. During this charging process, the DC/DC converter 9, control device 8, and switching element 16, 17 remain deactivated. Thus, only converter losses occur at the DC/DC converter 5, which are minimized by the MPPT functionality. If the SOC value of the low-voltage battery should reach a third threshold value X3 during the vehicle standstill, the control device 7 of the low-voltage battery 3 may wake the control device 8 and activate the DC/DC converter 9. The control device 8 then closes the switching elements 16, 17, and the low-voltage battery 3 is again discharged until reaching the first threshold value X1, and the high-voltage battery 2 is correspondingly charged. Subsequently, the switching elements 16, 17 are again opened and, if necessary, an SOC value of the high-voltage battery 2 is reported to the control device 7. Subsequently, the control device 8 goes again into sleep mode, and the control device 7 deactivates the DC/DC converter 9. The third threshold value X3 is, for example, between 90% and 100%, which corresponds to an actual capacity of 54 to 60 Ah.

However, if the solar module 4 supplies less electrical energy during the vehicle standstill than is consumed by the quiescent current consumption of the onboard electrical system consumers 6, 7, 8, the low-voltage battery 4 slowly discharges. Therefore, a second threshold value of, for example, 40% exists (corresponding to an actual capacity of 24 Ah), at which the control device 7 wakes the control device 8 and activates the DC/DC converter 9. The control device 8 then closes the switching elements 16, 17, and the control device 7 controls the DC/DC converter 9 in such a way that the low-voltage battery 3 is charged via the high-voltage battery 2 to the first threshold value X1. Subsequently, the switching elements 16, 17 may again be opened, and the control device 8 may go into sleep mode.

During driving operation, the low-voltage battery 3 is charged via the solar module 4, the low-voltage battery 3 being charged via the high-voltage battery 2 when the second threshold value X2 is reached, and the high-voltage battery 2 being charged via the low-voltage battery 3 when the third threshold value X3 is reached.

By choosing the threshold values X1 to X3 and the magnitude of the nominal capacity, it is thus possible to set how often recharging processes between the two batteries take place. Thus, the threshold values X1 to X3 may be parameterizable, i.e., they are, for example, functions of the battery temperature, quiescent current consumption, and/or solar radiation.

The invention claimed is:

1. An electrical power supply network for a transportation vehicle, the electrical power supply network comprising:
   at least one high-voltage battery and one low-voltage battery;
   at least one DC/DC converter is arranged between the high-voltage battery and the low-voltage battery such that the high-voltage battery charges the low-voltage battery;
   at least one solar module, connected to the low-voltage battery via a DC/DC converter,
   wherein at least one control device is in communication with the low-voltage battery and is configured to determine a state of charge (SOC) value of the low-voltage battery, and
   wherein during a vehicle standstill, the high-voltage battery is charged from the low-voltage battery via the at least one DC/DC converter until the SOC value of the low-voltage battery reaches a first threshold value,
   wherein, in response to a drop in the SOC value of the low-voltage battery below a second threshold value, the at least one control device controls the at least one DC/DC converter between the high-voltage battery and the low-voltage battery to charge the low-voltage battery, wherein the second threshold value is smaller than the first threshold value.

2. The electrical power supply network of claim 1, wherein, during the vehicle standstill or during travel, the at least one control device controls charging of the low-voltage battery by the solar module via the DC/DC converter, wherein when a third threshold value for the SOC value is reached which is greater than the first threshold value, the high-voltage battery is charged from the low-voltage battery until the first threshold value is reached.

3. The electrical power supply network of claim 1, wherein the first threshold value for the SOC value is selected so that the remaining capacity is greater than or equal to 28 Ah.

4. The electrical power supply network of claim 1, wherein the first threshold value for the SOC value is selected so that the remaining capacity is less than 28 Ah.

5. The electrical power supply network of claim 1, wherein at least one switching element is arranged between the high-voltage battery and the DC/DC converter, which is controlled by a control device associated with the high-voltage battery.

6. A method for distributing electrical energy in an electrical power supply network for a transportation vehicle, by at least one high-voltage battery and one low-voltage battery, the method comprising:
   providing at least one DC/DC converter arranged between the high-voltage battery and the low-voltage battery, through which the high-voltage battery charges the low-voltage battery, and a solar module, which is connected to the low-voltage battery via a DC/DC converter;
   ascertaining an SOC value of the low-voltage battery using at least one control device that is associated with the low-voltage battery; and
   charging the high-voltage battery from the low-voltage battery via a DC/DC converter during a vehicle standstill until the SOC value of the low-voltage battery reaches a first threshold value,
   wherein the method further comprises, in the case of a drop in the SOC value of the low-voltage battery below a second threshold value, the at least one control device controlling the at least one DC/DC converter between the high-voltage battery and the low-voltage battery, to charge the low-voltage battery from the high-voltage battery, wherein the second threshold value is smaller than the first threshold value.

7. The method of claim 6, wherein the method further comprises, during the vehicle standstill or during travel, charging the low-voltage battery by the solar module via the DC/DC converter, wherein when a third threshold value for the SOC value is reached which is greater than the first threshold value, the high-voltage battery is charged from the low-voltage battery until the first threshold value is reached.

8. The method of claim 7, wherein at least one switching element is arranged between the high-voltage battery and the DC/DC converter, which is controlled by a control device associated with the high-voltage battery, and the method further comprises, during the vehicle standstill, the control device associated with the low-voltage battery waking the control device associated with the high-voltage battery and the control device associated with the low-voltage battery closing the switching element until the charging process of the high-voltage battery from the low-voltage battery has ended.

* * * * *